United States Patent
Boydell

(10) Patent No.: US 8,260,499 B2
(45) Date of Patent: Sep. 4, 2012

(54) AUTOMATIC STEERING SYSTEM AND METHOD FOR A WORK VEHICLE WITH FEEDBACK GAIN DEPENDENT ON A SENSED PAYLOAD

(75) Inventor: Broughton Boydell, NSW (AU)

(73) Assignee: Deere & Company, Moline, IL (US)

( * ) Notice: Subject to any disclaimer, the term of this patent is extended or adjusted under 35 U.S.C. 154(b) by 1188 days.

(21) Appl. No.: 11/742,711

(22) Filed: May 1, 2007

(65) Prior Publication Data

US 2008/0275609 A1    Nov. 6, 2008

(51) Int. Cl.
*A01B 69/00*    (2006.01)
(52) U.S. Cl. ........... 701/42; 701/41; 701/50; 701/58; 701/60; 342/124; 340/995.2; 340/995.21; 340/438; 340/440; 340/684
(58) Field of Classification Search ......... 701/1, 23–28, 701/36, 50, 60, 116, 200–217; 340/988–996
See application file for complete search history.

(56) References Cited

U.S. PATENT DOCUMENTS

| | | | |
|---|---|---|---|
| 3,550,362 A | 12/1970 | Graeber | |
| 3,946,825 A | 3/1976 | Gail | |
| 4,042,132 A * | 8/1977 | Bohman et al. | 414/335 |
| 4,212,366 A * | 7/1980 | Ohtuka et al. | 180/422 |
| 4,376,609 A * | 3/1983 | Bohman et al. | 414/335 |
| 4,926,960 A * | 5/1990 | Ishikura et al. | 180/446 |
| 5,282,389 A * | 2/1994 | Faivre et al. | 73/861.73 |
| 5,318,475 A * | 6/1994 | Schrock et al. | 460/1 |
| 5,529,537 A * | 6/1996 | Johnson | 460/6 |
| 5,575,316 A * | 11/1996 | Pollklas | 141/198 |
| 5,659,470 A * | 8/1997 | Goska et al. | 701/33.4 |
| 5,666,793 A * | 9/1997 | Bottinger | 56/10.2 R |
| 5,721,679 A * | 2/1998 | Monson | 701/207 |
| 5,749,783 A * | 5/1998 | Pollklas | 460/119 |
| 5,778,327 A | 7/1998 | Simmons et al. | |
| 5,842,920 A * | 12/1998 | Siepker | 460/119 |
| 5,857,539 A | 1/1999 | Diekhans et al. | |
| 5,901,535 A * | 5/1999 | Duckinghaus et al. | 56/10.2 G |
| 5,902,343 A * | 5/1999 | Hale et al. | 701/50 |
| 5,921,335 A * | 7/1999 | Straetker | 180/6.44 |
| 6,061,618 A * | 5/2000 | Hale et al. | 701/50 |
| 6,070,539 A * | 6/2000 | Flamme et al. | 111/177 |
| 6,074,298 A * | 6/2000 | Majkrzak et al. | 460/119 |
| 6,091,997 A * | 7/2000 | Flamme et al. | 700/83 |
| 6,097,425 A * | 8/2000 | Behnke et al. | 348/89 |
| 6,208,922 B1 * | 3/2001 | Easton | 701/41 |
| 6,216,071 B1 * | 4/2001 | Motz | 701/50 |
| 6,377,889 B1 | 4/2002 | Soest | |
| 6,434,462 B1 | 8/2002 | Bevly et al. | |

(Continued)

FOREIGN PATENT DOCUMENTS

EP    0381073    9/1996

(Continued)

*Primary Examiner* — Jonathan M Dager

(57) ABSTRACT

An automatic steering system for a work vehicle comprises a position sensor for detecting a position of the vehicle, a memory for storing information about a nominal path of the vehicle and a control unit coupled to the position sensor, to the memory and to a steering actuator for steering the vehicle. The control submits control signals to the steering actuator that depend upon a feedback gain and a lateral offset between the actual position and the nominal path. The feedback gain depends upon a sensed payload of the vehicle.

10 Claims, 3 Drawing Sheets

U.S. PATENT DOCUMENTS

| | | |
|---|---|---|
| 6,510,367 B1 * | 1/2003 | McQuinn .................. 700/241 |
| 6,556,909 B2 | 4/2003 | Matsumoto et al. |
| 6,598,699 B2 * | 7/2003 | Takehara et al. .......... 180/446 |
| 6,682,416 B2 * | 1/2004 | Behnke et al. ............. 460/114 |
| 6,901,319 B1 * | 5/2005 | Nelson et al. ............... 701/41 |
| 6,943,824 B2 * | 9/2005 | Alexia et al. ................. 348/89 |
| 6,990,399 B2 * | 1/2006 | Hrazdera et al. ............ 701/50 |
| 6,994,623 B2 * | 2/2006 | Isfort et al. ................. 460/114 |
| 7,099,760 B2 | 8/2006 | Lin et al. |
| 7,127,340 B2 | 10/2006 | Schick et al. |
| 7,198,450 B2 * | 4/2007 | Matousek et al. .......... 414/523 |
| 7,275,357 B2 * | 10/2007 | Covington et al. ........... 56/28 |
| 7,337,023 B2 * | 2/2008 | Diekhans ..................... 700/52 |
| 7,574,290 B2 * | 8/2009 | Gibson et al. ................ 701/26 |
| 7,751,927 B2 * | 7/2010 | Pulli et al. .................. 700/213 |
| 7,756,623 B2 * | 7/2010 | Jarrett et al. ................. 701/50 |
| 2002/0083695 A1 * | 7/2002 | Behnke et al. ............... 56/119 |
| 2002/0169536 A1 * | 11/2002 | Feucht et al. ................. 701/50 |
| 2002/0193929 A1 * | 12/2002 | Beck ............................. 701/50 |
| 2003/0063968 A1 * | 4/2003 | Zaun et al. .................. 414/546 |
| 2003/0187560 A1 * | 10/2003 | Keller et al. ................. 701/50 |
| 2004/0193348 A1 | 9/2004 | Gray et al. |
| 2004/0210357 A1 * | 10/2004 | McKay et al. ................ 701/23 |
| 2005/0096802 A1 | 5/2005 | Han et al. |
| 2006/0016166 A1 | 1/2006 | Dubois |
| 2006/0025894 A1 * | 2/2006 | O'Connor et al. ............. 701/1 |
| 2006/0041354 A1 | 2/2006 | Schick et al. |
| 2006/0190152 A1 * | 8/2006 | Schick et al. ................. 701/41 |
| 2006/0211535 A1 | 9/2006 | Casey |
| 2006/0282205 A1 * | 12/2006 | Lange ........................... 701/50 |
| 2007/0042803 A1 * | 2/2007 | Anderson .................. 455/556.1 |
| 2007/0050117 A1 * | 3/2007 | Kitzler et al. ................ 701/50 |
| 2007/0088482 A1 * | 4/2007 | Mailer ........................... 701/50 |
| 2007/0135190 A1 * | 6/2007 | Diekhans et al. ............... 460/1 |
| 2008/0041655 A1 * | 2/2008 | Breiner et al. .............. 180/418 |
| 2008/0228353 A1 * | 9/2008 | Mayfield et al. .............. 701/41 |

FOREIGN PATENT DOCUMENTS

| | | |
|---|---|---|
| EP | 1688027 | 8/2006 |
| GB | 718247 | 11/1954 |
| GB | 772426 | 4/1957 |

* cited by examiner

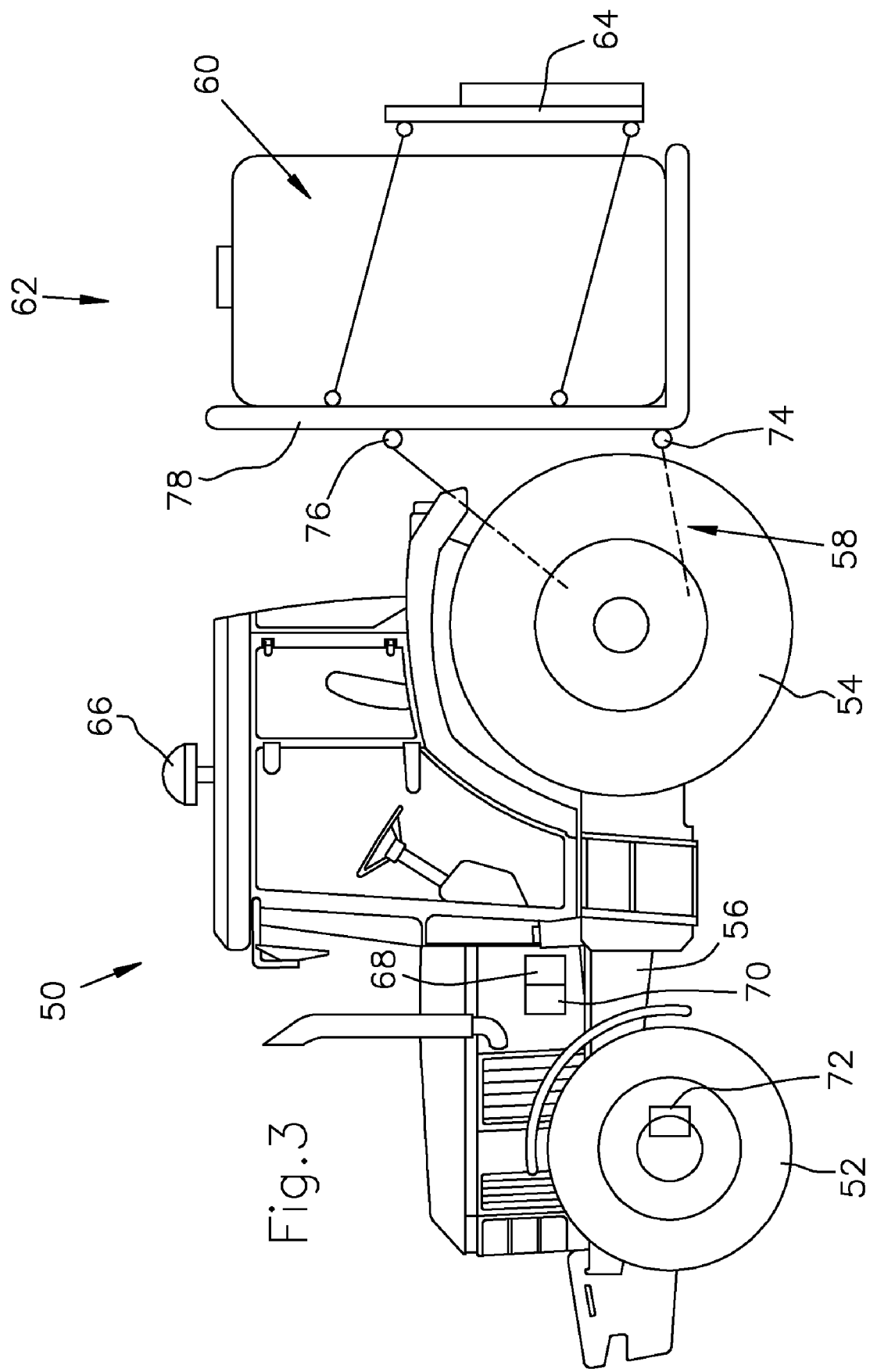

AUTOMATIC STEERING SYSTEM AND METHOD FOR A WORK VEHICLE WITH FEEDBACK GAIN DEPENDENT ON A SENSED PAYLOAD

FIELD OF THE INVENTION

The present invention relates to an automatic steering system and a corresponding method for a work vehicle.

BACKGROUND OF THE INVENTION

In the prior art, numerous automatic steering systems have been described that are operable to guide agricultural vehicles and implements automatically along a desired path over a field. Such automatic steering systems comprise a position sensor for detecting the actual position of the vehicle in the field, a memory storing information about a nominal, intended path of the vehicle over the field, a control unit coupled to the position sensor and to the memory and to a steering actuator that is suited to steer the vehicle. The steering actuator is controlled dependent upon the lateral offset between the actual position and the nominal path in a manner to keep the vehicle on the nominal path. A so-called feedback gain determines the relation or ratio between the lateral offset and the steering reaction of the steering actuator.

In the prior art, it was proposed to vary the feedback gain dependent on the propelling speed of the vehicle, wherein the feedback gain decreases with increasing propelling speed (U.S. Pat. Nos. 5,857,539 A, 3,946,825 A, 3,550,362 A, EP 0 381 073 A). Further, it was described to control the feedback gain dependent on the position of a moveable implement or upon a detected steering oscillation (U.S. Pat. No. 7,127,340 B), based upon a detected wheel slip rate (U.S. Pat. No. 6,901,319 B), and on vehicle kinematics (US 2004/0210357 A). It was also described to control the steering actuator based upon a detected lateral terrain slope (EP 1 688 027 A, U.S. Pat. No. 3,946,825 A).

The reaction of a moving vehicle to an action of the steering actuator depends among others on the mass or weight of the vehicle. For example, a combine with an empty grain tank follows a steering action of the steered rear wheels faster and easier than a combine with a full grain tank, since the grain mass in the grain tank corresponds to some 10% of the mass of the empty combine. This sensibility of the steering reaction to the vehicle mass is present in all work vehicles with variable payload, for example self-propelled and pulled sprayers, seeding machines, harvesting machines like combines and balers, and transport vehicles for any material. In the prior art, a variable mass or payload of a work vehicle has not been taken into account for determining the feedback gain of automatic steering systems. Dependent on the actual payload of the vehicle, the steering reaction can thus be too small or too large, leading to insufficient performance or stability of the automatic steering system.

Thus, there is a need for a simple and reliable system for controlling an automatic steering system taking the payload of the vehicle into account.

It is an object of the present invention to provide an improved automatic steering system responsive to the payload of the vehicle.

SUMMARY OF THE INVENTION

An automatic steering system for a work vehicle comprises a position sensor for detecting an actual position of the vehicle in a field, a memory for storing information about a nominal path of the vehicle over the field and a control unit coupled to the position sensor, to the memory and to a steering actuator that steers the vehicle or controls the direction into which the vehicle moves. The control unit is operable to submit control signals to the steering actuator that depend upon a feedback gain and a lateral offset between the actual position and the nominal path. The feedback gain depends upon a sensed payload of the vehicle.

It is an advantage of the invention that the actual payload of the vehicle is considered when the steering reaction to a deviation of the vehicle from the nominal path is determined. The performance and stability of the steering system is thus improved. The steering reaction will be larger for a vehicle carrying a large payload than for a vehicle without any payload or only a small payload.

The position sensor for detecting the actual position of the vehicle in the field can sense the absolute position of the vehicle and thus be a receiver of a satellite based positioning system, such as a Global Positioning System (GPS). In another embodiment, the position sensor for detecting the actual position of the vehicle can detect a relative position of the vehicle with respect to an object, for example to an edge between harvested and not harvested crop or a row of crop. The position sensor can then comprise at least one of a camera cooperating with an image processing device, a flight-time based scanning laser reflection sensor, and an ultrasonic or mechanical position sensor detecting the location of a crop edge or row. The type of information about the nominal path of the vehicle over the field stored in the memory depends on the type of the position sensor detecting the actual position of the vehicle. If the position sensor detects the absolute position, the nominal path information can be a map containing the desired path of the vehicle. If the position sensor detects a relative position, for example with respect to a crop edge, the nominal path information can just be a desired distance between the longitudinal center plane of the vehicle and the crop edge. It would also be possible to combine both types of position sensors and nominal path information.

The steering actuator is provided by the control unit with a steering signal that depends on the lateral offset between the vehicle position and the nominal path, and the payload-dependent steering gain. In one embodiment, the steering signal is obtained by multiplying the offset by the steering gain.

The invention can be used on any type of agricultural vehicles and corresponding implements. Examples are harvesting machines like combines and balers, and sprayers. The payload can be provided on the self propelled vehicle or on a trailer pulled by the vehicle.

The payload of the vehicle can be sensed directly, for example by weighing a payload container or by sensing the fill state of the payload container. It can also be sensed indirectly by detecting the flow into a payload container or out of it, and integrating the flow over time to obtain the payload. In another embodiment, the weight of the entire vehicle or of its chassis can be sensed.

These and other objects, features and advantages of the present invention will become apparent to one skilled in the art upon reading the following detailed description in view of the drawings.

BRIEF DESCRIPTION OF THE DRAWINGS

FIG. 3 is a side view of another vehicle with an automatic steering system.

DESCRIPTION OF THE PREFERRED EMBODIMENT

Figure 1:
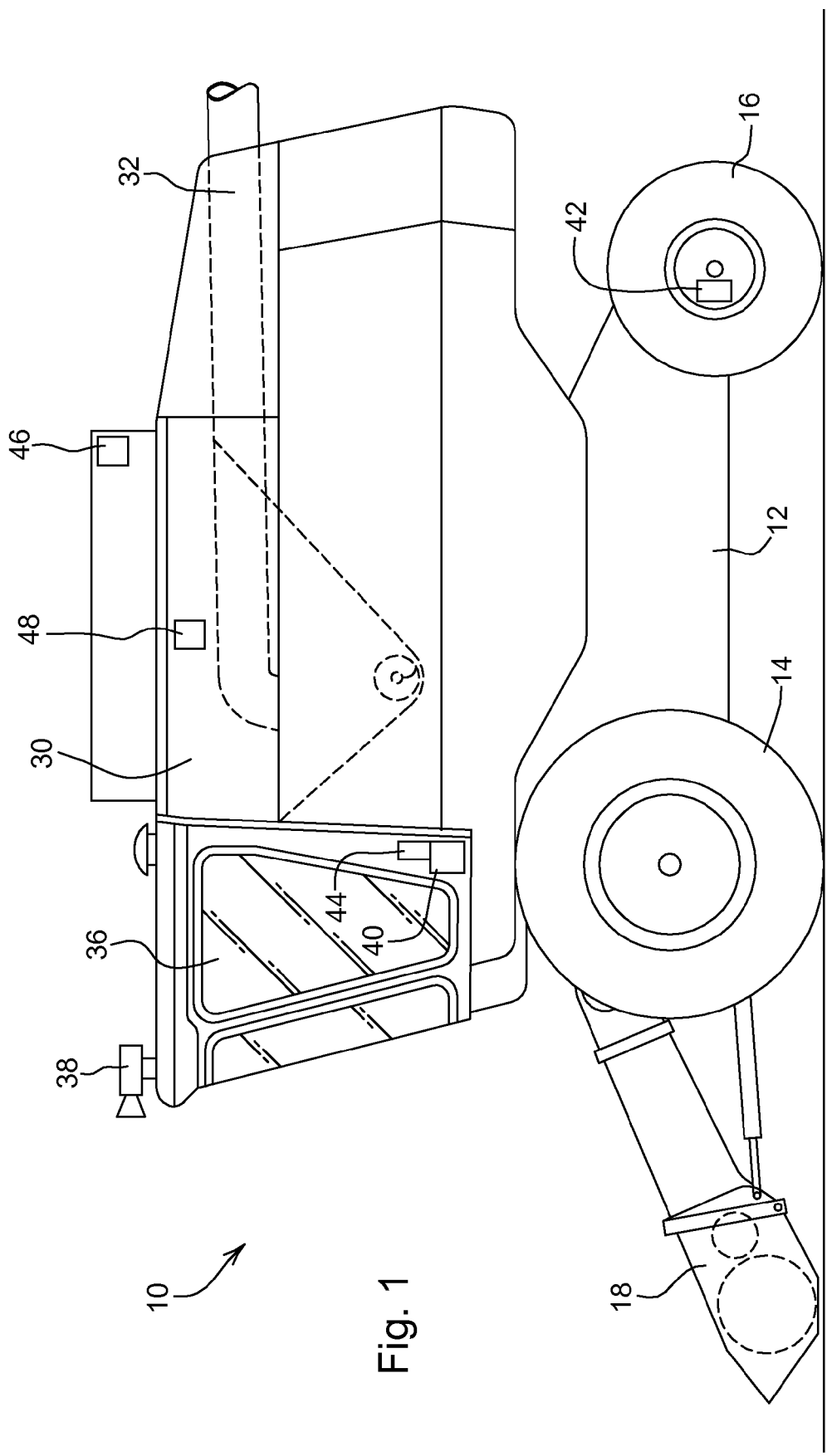
FIG. 1 is a side view of a vehicle with an automatic steering system.

Referring now to FIG. 1, therein is shown an agricultural vehicle in the form of a combine 10 comprising a main frame 12 having driven front wheels 14 and steerable rear ground engaging wheels 16 supporting the main frame 12 for forward movement over a field of crop to be harvested. Although wheels 14 and 16 are shown, the ground engaging means of combine 10 could include or be composed of ground engaging tracks. Drive to the front wheels 14 is provided through a conventional hydrostatic transmission (not shown) by an internal combustion engine (not shown) mounted on the frame 12. In the following, references to directions (like forward) are cited with respect to the forward direction of combine 10 that is directed to the left in FIG. 1.

An implement in the form of a header or harvesting platform 18 is used for harvesting a crop. The harvested crop is cleaned and separated, and the cleaned grain is directed to a grain tank 30. The clean grain in the grain tank 30 can be unloaded into a grain cart or truck by unloading auger 32.

The operation of the combine 10 is controlled from an operator's cab 36. An automatic steering system of the combine 10 comprises a position sensor 38, a control unit 40, a steering actuator 42 operable to control the steering angle of the rear wheels 16, and a memory 44. The position sensor 38 comprises a camera mounted on the roof of the cab 36 and viewing into the forward direction. An image processing system provided within the housing of the position sensor 38 or included into control unit 40 processes the images from the camera and provides a signal representing the distance between a lateral edge of the harvesting platform 18 (or the longitudinal center plane of combine 10) and an edge of cut crop to control unit 40. Memory 44 contains information about a desired distance between the cut edge and the lateral edge of the harvesting platform 18, which usually corresponds to some cm (or to the longitudinal center plane of combine 10, which corresponds to half of the cutting width of the harvesting platform 18). The control unit 40 is controlling the steering actuator 42 to steer the combine 10 on a desired path on which one edge of the harvesting platform 18 is guided along the crop edge.

In the grain tank 30, a fill state sensor 46 is provided which senses the height of grain in the grain tank 30, preferably with ultrasonic waves or optically. A grain flow sensor 48, such as in the form of an impact plate is mounted at the outlet of the clean grain elevator 28. However, it can be appreciated that other types of grain flow sensors can be used as well.

Figure 2:
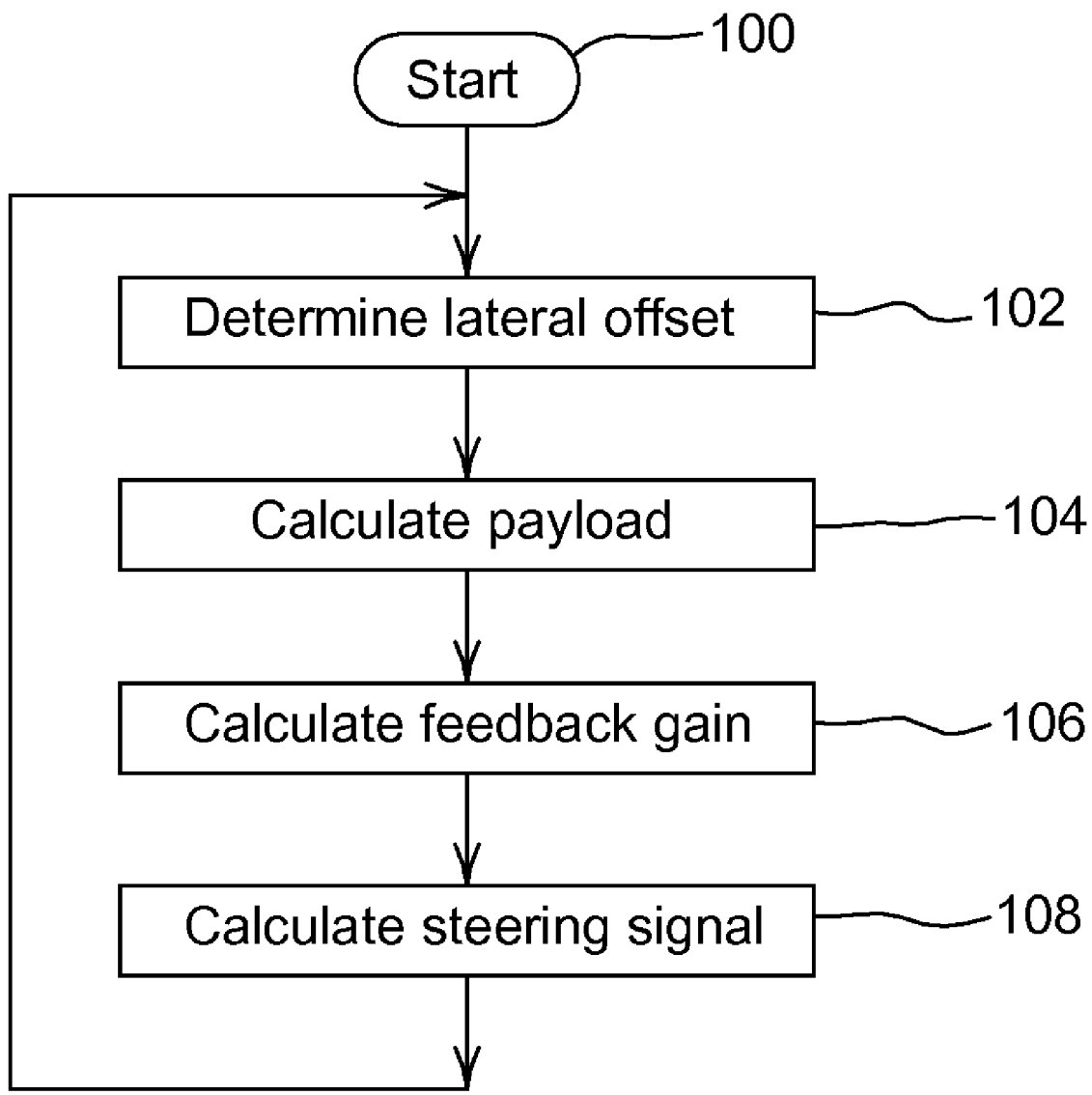
FIG. 2 is a flow diagram according to which the control unit adjusts the steering actuator of the vehicle in FIG. 1.

During automatic steering operation, the control unit 40 operates according to the flow diagram shown in FIG. 2. After start in step 100, in step 102 the lateral offset of combine 10 from the intended path is determined, by subtracting the desired distance stored in memory 44 from the distance between the lateral edge of the harvesting platform 18 and the edge of cut crop measured by position sensor 38. This lateral offset affects in which direction and with which angle the rear wheels 16 should be steered by steering actuator 42 to keep on the desired path.

In subsequent step 104, the payload in grain tank 30 is calculated. This can be done using only the value from fill state sensor 46, or by integrating the values from flow sensor 48 over time, or combining both values. If only the value from the flow sensor 48 is used for determining the payload, information about an empty grain tank 30 can be derived from a drive mechanism of unloading auger 32, assuming that the grain tank 30 is empty once the unloading auger 32 has been running for a predetermined time. The payload can be calculated in volume units or in mass units, by multiplying the sensed volume in the grain tank with a density, which can be input to the control unit 40 by a user via a suitable interface or sensed with a suitable sensor.

In step 106, a feedback gain is calculated in the control unit, using a stored table or formula. The feedback gain depends upon the payload and increases with the payload, preferably linearly. In a possible embodiment, the feedback gain is obtained by dividing the sum of the mass of the empty vehicle and the payload by the mass of the empty vehicle. Additional parameters, like the propelling speed of vehicle 10 can be taken into account for determining the feedback gain. The feedback gain can also be fine-tuned by an operator in the cab 36 via a suitable interface.

In step 108, the steering signal is calculated by multiplying the offset with the feedback gain and sending the value to steering actuator 42. Step 102 follows again.

A second embodiment of the invention is shown in FIG. 3. A vehicle 50 in the form of a tractor has steerable front wheels 52 and driven rear wheels 54 supporting a frame 56. A three-point hitch 58 mounts an implement; in this case, a spraying implement 62 comprising a tank 60 and a boom 64 with nozzles. The automatic steering system comprises a position sensor 66 in the form of a GPS antenna, a control unit 68, a memory 70 containing a map of the intended path of the vehicle 50, and a steering actuator 72 operable to control the steering angle of the front wheels 52. Two sensors 74, 76 mounted between the three-point hitch 58 and a frame 78 of the spraying implement 62 sense the weight of the spraying implement 62 including the payload within the tank 60. In another embodiment, the weight of the spraying implement 62 can be derived by sensing the hydraulic pressure in hydraulic actuators of the three-point hitch 58. It would also be possible to measure the fill state of tank 60 with a suitable sensor, preferably optically or mechanically or with ultrasonic waves, or to sense the flow of product from the tank 60 to the nozzles of the boom 64, and to integrate the flow over time to determine how much product has been taken from tank 60, thereby assuming the tank 60 has been full at the start of operation, or inputting or sensing the fill state.

During operation, the control unit 68 works also according to the flow diagram of FIG. 2, such that reference is made to the corresponding description above. The only significant difference is that in step 102, the lateral offset is determined based upon an absolute position signal from the position sensor 66 and the map in memory 70. The feedback gain is increasing with the sensed payload in tank 60.

Having described the preferred embodiment, it will become apparent that various modifications can be made without departing from the scope of the invention as defined in the accompanying claims.

The following is claimed:

1. An automatic steering system for a work vehicle comprising:
   a position sensor for detecting a position of the vehicle;
   a fill-state sensor for detecting optically or ultrasonically a height of material in a tank of the vehicle to calculate a sensed payload as a volume of the material in the tank;
   a memory for storing information about a nominal path of the vehicle; and
   a control unit coupled to the position sensor, to the memory and to a steering actuator, the control unit configured to submit control signals to the steering actuator that depend upon a feedback gain and a lateral offset between the actual position and the nominal path, wherein the feedback gain for the steering actuator depends upon the sensed payload of the vehicle and where the feedback gain increases linearly with the payload.

2. The system according to claim 1, wherein the control unit is configured to increase the feedback gain with an increase in the volume of the payload.

3. The system according to claim 1, wherein a grain flow sensor detects a flow of the material from an outlet of the tank to calculate the sensed payload in cooperation with the fill-state sensor.

4. The system according to claim 1, wherein the control unit is connected to a position sensor operable to sense a flow of product at least one of received and delivered by a payload container of the vehicle, and wherein the control unit is operable to integrate the sensed flow values over time to derive the payload.

5. The system according to claim 1, wherein the payload comprises agricultural chemicals contained in the tank.

6. The system according to claim 1, wherein the payload is contained in a container for receiving harvested crop.

7. A method for automatic steering a work vehicle comprising:

storing information about a nominal path of the vehicle;

detecting a position of the vehicle;

optically or ultrasonically sensing a height of material within a tank of the vehicle to calculate a payload of the vehicle as a volume of material in the tank;

determining a feedback gain for the steering actuator, the feedback gain dependent upon the volume of the sensed payload, where the feedback gain increases linearly with the payload; and steering the vehicle dependent upon the feedback gain and a lateral offset between the actual position and the nominal path.

8. The method according to claim 7, wherein the feedback gain increases with an increase in the payload.

9. The method according to claim 7 wherein the sensing of the payload further comprises:

detecting a height or a level of material in a tank of the vehicle to calculate the sensed payload as a volume or a mass of the material.

10. The method according to claim 7 wherein the sensing of the payload further comprises:

detecting a flow of the material from an outlet of the tank to calculate the sensed payload by integrating detected values of flow over time.

\* \* \* \* \*